Jan. 23, 1923.
J. E. DEZELL.
CIRCULAR GLASS CUTTER.
FILED FEB. 26, 1920.
1,442,926.
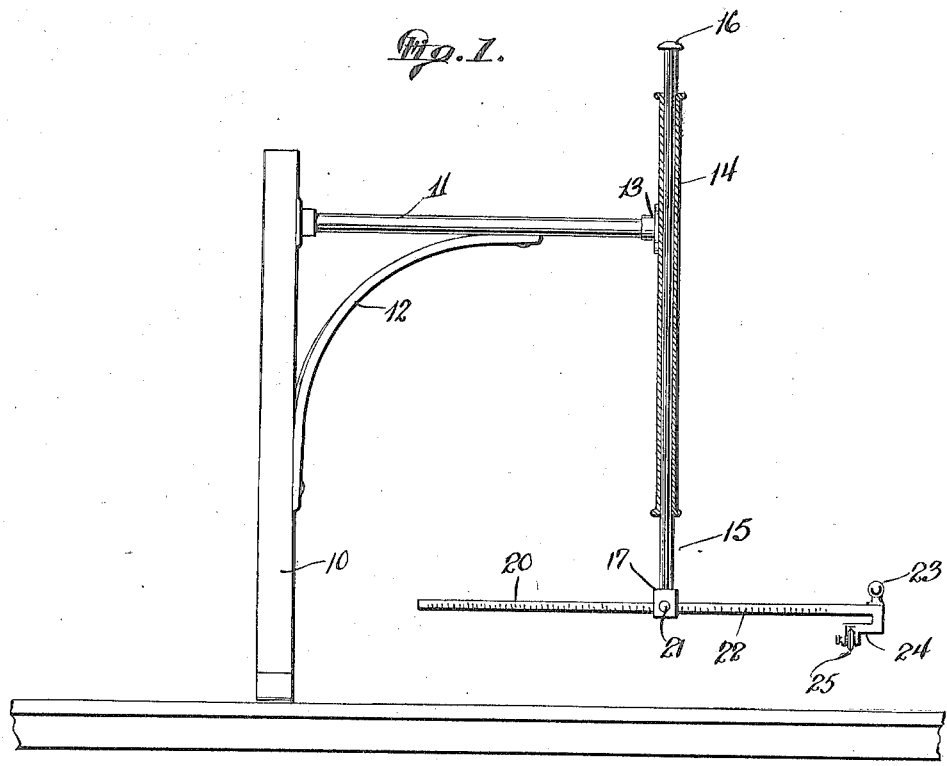
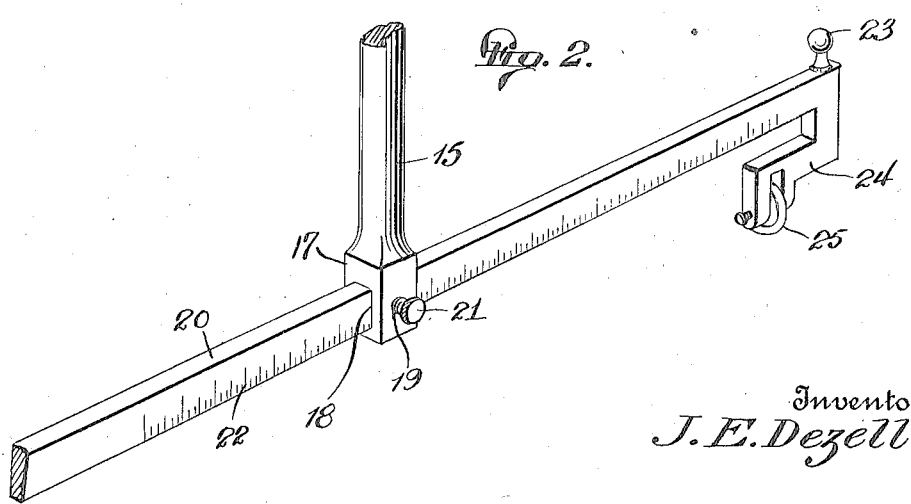
Inventor
J. E. Dezell
By J. Raney Kelly, Attorney Patented Jan. 23, 1923.

1,442,926

UNITED STATES PATENT OFFICE.

JOHN ELTON DEZELL, OF QUINCY, FLORIDA.

CIRCULAR GLASS CUTTER.

Application filed February 26, 1920. Serial No. 361,541.

*To all whom it may concern:*

Be it known that I, JOHN ELTON DEZELL, a citizen of the United States, residing at Quincy, in the county of Gadsen and State of Florida, have invented certain new and useful Improvements in a Circular Glass Cutter, of which the following is a specification.

The present invention relates to improvements in glass cutters and more particularly to a glass cutter of the circular type.

The main object of the invention is to provide a circular glass cutter which is readily adjustable both horizontally and vertically, to compensate for the varying thicknesses of glass, in the first instance, and to permit adjustment of the cutter wheel so that pieces of glass of different diameters may be cut.

A further object of the invention is to provide a device of the character set forth above which is simple in construction, cheap to manufacture and convenient to operate.

A still further object of the invention is to provide means whereby ready access may be had to the cutter wheel at all times to facilitate the changing of the wheel should occasion so require.

Various other objects and advantages of my invention will become apparent during the continuance of the following description.

In the drawings:—

Fig. 1 is a view in elevation showing my invention as in its preferred embodiment.

Fig. 2 is a detailed view.

In reducing my invention to practice I first provide a support 10 which may be constructed of any suitable or desirable material. The support carries an arm 11 which extends at substantially right angles with respect thereto and preferably horizontally with respect to the floor or other base (not shown). A brace arm 12 may also be employed to aid in supporting the arm 11 in a rigid position, the arm 12 being connected with the support 10 and the arm 11 as clearly shown in Fig. 1.

The outer end of the arm 11 is journaled in the collar 13 of a vertically disposed sleeve 14 the latter being open at its upper and lower end and extending both above and below the arm 11. It is pointed out that a screw thread connection may be had between the arm 11 and the sleeve 14 and more particularly between the arm 11 and the collar 13. However this construction is merely collateral to the main invention and I do not wish to limit myself to its use or application.

A rod 15 extends through the sleeve 14 and is substantially longer than the sleeve in order to permit the slidable movement thereof. A head 16 is formed at the upper end of the rod to limit movement in one direction with respect to the sleeve and another head 17 is carried at the lower end of the rod and may have screw threaded connection therewith. It is pointed out that while the main purpose of the head 17 is to carry the glass cutting device and to permit adjustment thereof, it also serves to limit the upper movement of the rod as is obvious upon reference to the drawings.

The head or block 17 is provided with a transverse slot or opening 18 and another opening 19 at right angles to the first named opening. The cutting rod 20 is positioned through the transverse slot or opening 18 while a thumb screw 21 is positioned in the opening 19 in order to retain the cutting rod in rigid relation to the head 17 and the rod 15 and yet permit a ready adjustment thereof. Suitable graduations may be placed on the cutting rod 20 as shown at 22 and a knob or handle 23 is positioned at one end thereof whereby it may be swung about the sleeve 14 which acts as a pivot.

One end of the cutting rod 20 may be provided with a depending finger 24 for carrying the cutting implement 25, the latter being positioned slightly below the plane of the cutting rod 20 as will be observed upon reference to the drawings. It is contemplated that the cutting implement 25 be readily moveable for the purpose of substitution or repair.

In operation the thumb screw 21 is loosened so as to permit adjustment of the rod 20 to the desired dimension after which the thumb screw may be tightened to hold a rod in a rigid relation to the rod 15. The cutting implement being engaged with the plate of glass, the operator may grasp the knob or handle 23 so as to swing the rods 20 and 15 about the sleeve 14 at the same time exerting a slight pressure on the knob or handle so that the cutting implement will score the glass in a circle of the desired diameter.

What is claimed is:—

A glass cutting device comprising a supporting structure, a tube supported thereby, a rod projecting beyond the tube at both ends and adjustable therein, one end of the rod being headed, a slotted head at the other end of the rod, a cutting element, a carrying rod adjustable in the slot of the said head and enlarged at one end to provide a knob or handle on the upper side, said rod being bent inwardly to form a finger extension spaced from, extending below and parallel to said rod, and means for holding said cutting element in said extension, said rod being movable in a circle about the said tube which acts as a pivot.

In testimony whereof I affix my signature.

J. ELTON DEZELL.